United States Patent [19]

Dunne

[11] Patent Number: 5,074,071
[45] Date of Patent: Dec. 24, 1991

[54] DECOY HOLDER ASSEMBLY

[76] Inventor: James E. Dunne, 35 Valley View Rd., Milford, Conn. 06460

[21] Appl. No.: 647,310

[22] Filed: Jan. 28, 1991

[51] Int. Cl.⁵ .......................................... A01M 31/06
[52] U.S. Cl. ................................................ 43/3; 43/2
[58] Field of Search ......................................... 43/3, 2

[56] References Cited

U.S. PATENT DOCUMENTS

| | | | |
|---|---|---|---|
| 710,433 | 10/1902 | Coudon | 43/3 |
| 796,147 | 8/1905 | Reynolds | 43/3 |
| 2,547,286 | 4/1951 | Sabin | 43/3 |
| 2,616,200 | 11/1952 | Milam | 43/3 |
| 2,624,144 | 1/1953 | Beverman | 43/3 |

*Primary Examiner*—Richard K. Seidel
*Assistant Examiner*—Chuck Y. Mah
*Attorney, Agent, or Firm*—John R. Doherty

[57] ABSTRACT

A decoy holder assembly comprising a plurality of decoys, a center block, and a plurality of connecting rods pivotally joined to the center block for holding the decoys. A locking element is rotatably mounted onto the center block and includes a plurality of spaced apart outwardly extending arm members. The arm members are placed in overlying relationship with respect to the connecting rods to restrict their movement from a position extending outwardly from the center block to a position directly below the block when the locking element is rotated to a first or locked position. Conversely, when rotated to a second or unlocked position, the locking element removes the arm members from overlying relationship with the connecting rods, releasing them so that they can pivot freely about the center block.

11 Claims, 4 Drawing Sheets

FIG. I 5,074,071

DECOY HOLDER ASSEMBLY

BACKGROUND OF THE INVENTION

This invention relates to decoys in general and more particularly to an improved decoy holder assembly for deploying a plurality of decoys in a realistic and natural formation.

Decoys have been used extensively by hunters to attract duck, geese and other fowl. The decoys float on top of the water and are anchored to the bottom of a pond, lake or the like by individual weights.

In recent years, various types of decoy holder assemblies have been devised for deploying a plurality of decoys. The decoys are connected to a common support, such as a center plate or block, which keeps the decoys spread apart from one another while floating on top of the water. The assembly can be anchored using only a single weight and can be easily removed from the water without detaching the decoys.

U.S. Pat. No. 4,660,313 to Bauernfeind et al. discloses a decoy holder assembly including a central plate and a plurality of connecting rods pivotally mounted to the plate. The connecting rods are held in spaced apart arrangement by a plurality of spreader bars attached to the rods. However, this arrangement is complicated and expensive and does not allow the connecting rods to pivot freely about the central plate for ease in deploying and removing the decoys.

U.S. Pat. No. 2,616,200 to Milan discloses a similar arrangement for a decoy holder in which the connecting rods are hingeably attached to a center plate but in which the rods are restricted to movement between a position outwardly extending from the plate to a position directly below the plate. Due to this restricted movement of the connecting rods, it is necessary to assemble the whole decoy holder before it can be deployed in the water.

It is an important object of the invention to provide an improved decoy holder assembly which is simple in construction and economical to manufacture.

Another object of the invention is to provide an improved decoy holder assembly which is easy to deploy and remove from the water.

Still another object is to provide an improved decoy holder assembly which allows the connecting rods to pivot freely about the center support and which enables the holder to be assembled while it is being deployed in the water.

SUMMARY OF THE INVENTION

The invention is directed a decoy holder assembly comprising a plurality of decoys, a center block, and a plurality of connecting rods pivotally joined to the center block for holding the decoys. A locking element is rotatably mounted onto the center block and includes a plurality of spaced apart outwardly extending arm members. The arm members are placed in overlying relationship with respect to the connecting rods to restrict their movement from a position extending outwardly from the center block to a position directly below the block when the locking element is rotated to a first or locked position. Conversely, when rotated to a second or unlocked position, the locking element removes the arm members from overlying relationship with the connecting rods, releasing them so that they can pivot freely about the center block.

BRIEF DESCRIPTION OF THE DRAWING

The invention will now be described in greater detail with particular reference to the accompanying drawings which show a preferred embodiment of a decoy holder assembly according to the invention and wherein.

DESCRIPTION OF THE PREFERRED EMBODIMENTS

Figure 1:
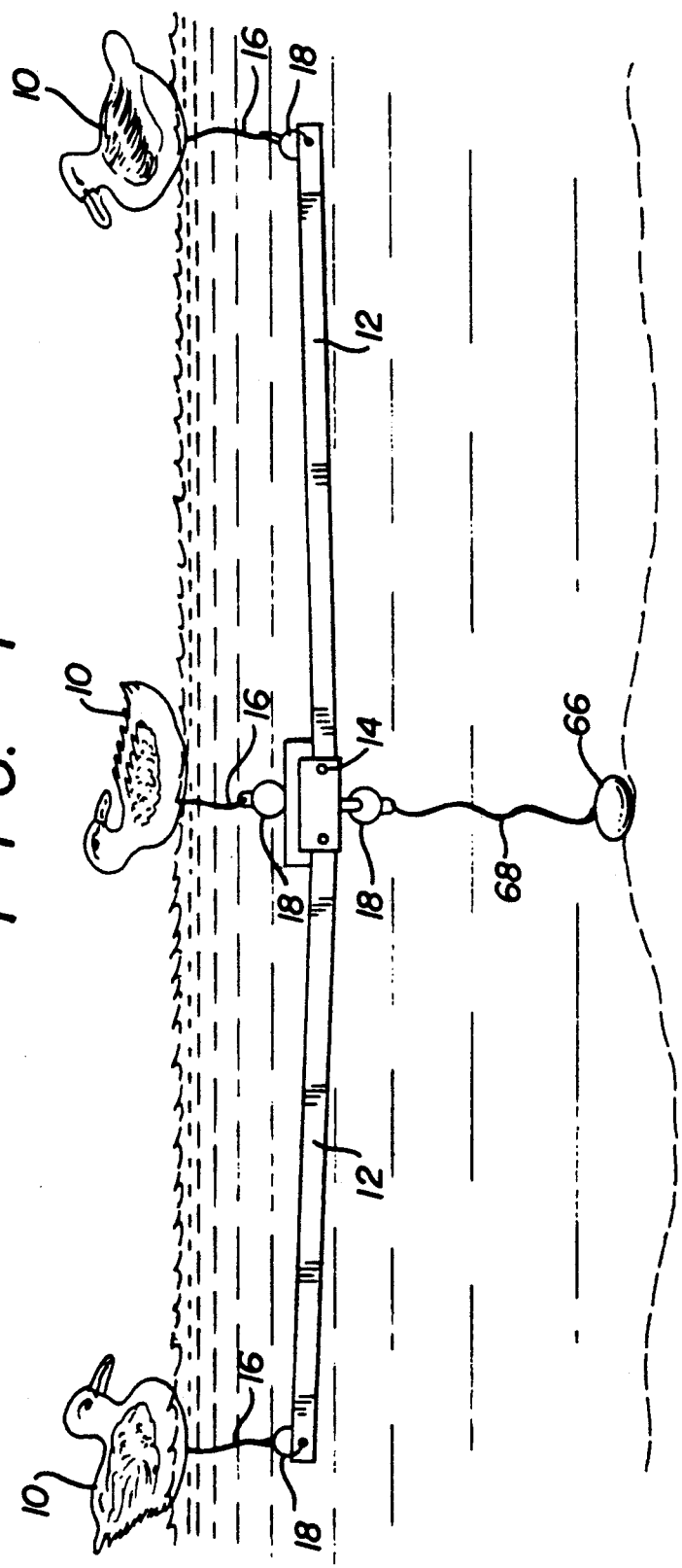
FIG. 1 is an elevational view of the decoy holder assembly of the invention shown anchored to the bottom of a pond or lake.
Figure 2:
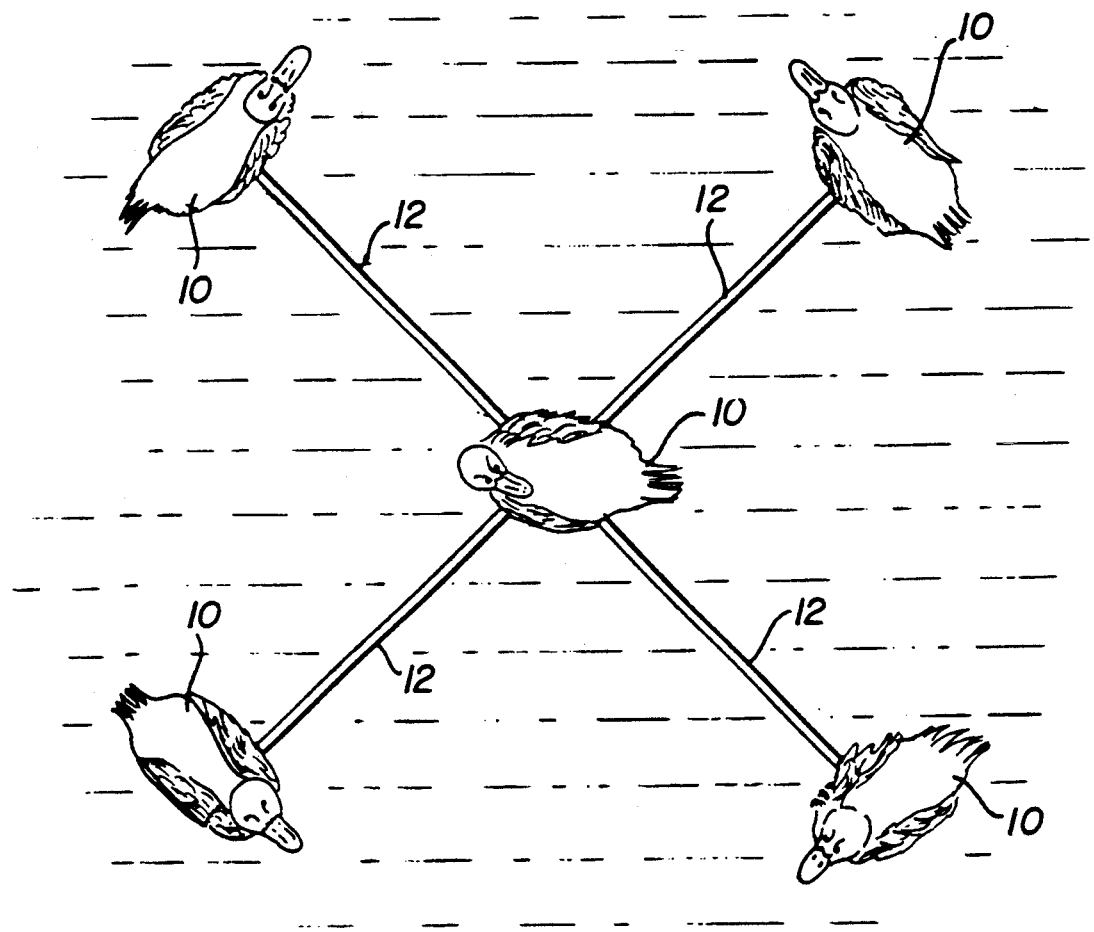
FIG. 2 is a top plan view of the decoy holder assembly shown in FIG. 1.

Referring now to the accompanying drawings, wherein like reference numerals designate the same or similar parts throughout the several views, it will be seen particularly from FIGS. 1 and 2 that a decoy holder assembly embodying the invention comprises a plurality of decoys 10, which may be in the form of ducks or geese, for example, held in a realistic and natural formation by a plurality of elongated connecting rods 12 which are pivotally joined at one end to a center block 14. In the embodiment of the decoy holder assembly illustrated, there are four decoys 10 attached to the outer end of four radially spaced apart connecting rods 12 and a sole decoy 10 attached to the center block 14. The connecting rods 12 and the center block 14 may be made of metal or a plastic material which is dense enough to cause them to submerge below the surface of the water where they will be out of sight of the unsuspecting game. The decoys 10 may be made of wood or any other material which is buoyant and which will allow the decoys to float on the top of the water. The decoys 10 may be attached to the connecting rods 12 and the center block 14 using flexible cords or chains 16. Both the connecting rods 12 and the center block 14 are supported below the surface of the water by the buoyancy of the decoys 10. Preferably, the cords or chains 16 are attached to swivel rings 18 mounted to the outer end of the connecting rods 12 and to the center block 14.

Figure 3:
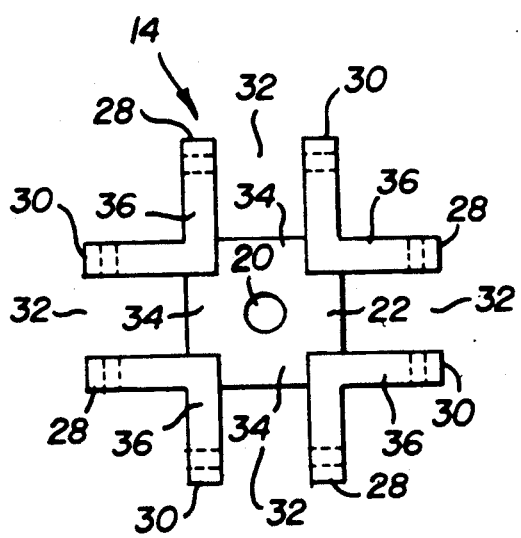
FIG. 3 is a top plan view of a center block used in the decoy holder assembly of FIGS. 1 and 2.
Figure 4:
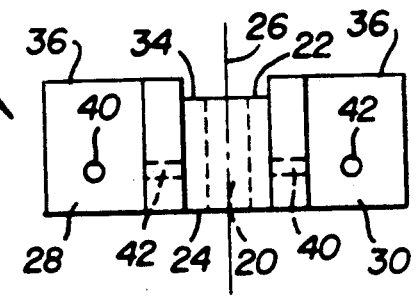
FIG. 4 is a side elevational view of the center block shown in FIG. 3.

As shown in FIGS. 3 and 4, the center block 14 is generally rectangular in shape and has a bore 20 extending between its top and bottom surfaces 22, 24, respectively, along a central vertical axis 26. The center block 14 is also formed with a pair of spaced apart, vertical wall members 28, 30 extending outwardly from each of its four sides, each pair of wall members 28, 30 defining therebetween one of four elongated slots 32 extending radially outwardly from the central vertical axis 26.

The center block 14 is preferably made together with the spaced apart wall members 28, 30 in one piece from a suitable plastic material. It will be noted in particular that the center block 14 is configured such that the wall members 28, 30 are raised to a level slightly above the top surface 22 forming therewith a recess 34 which is aligned with the slot 32. It will also be noted by this configuration that each wall member 28, 30 intersects an opposite counterpart on an adjacent side of the block 14 forming at each corner an L-shaped ridge as indicated at 36.

Figure 5:
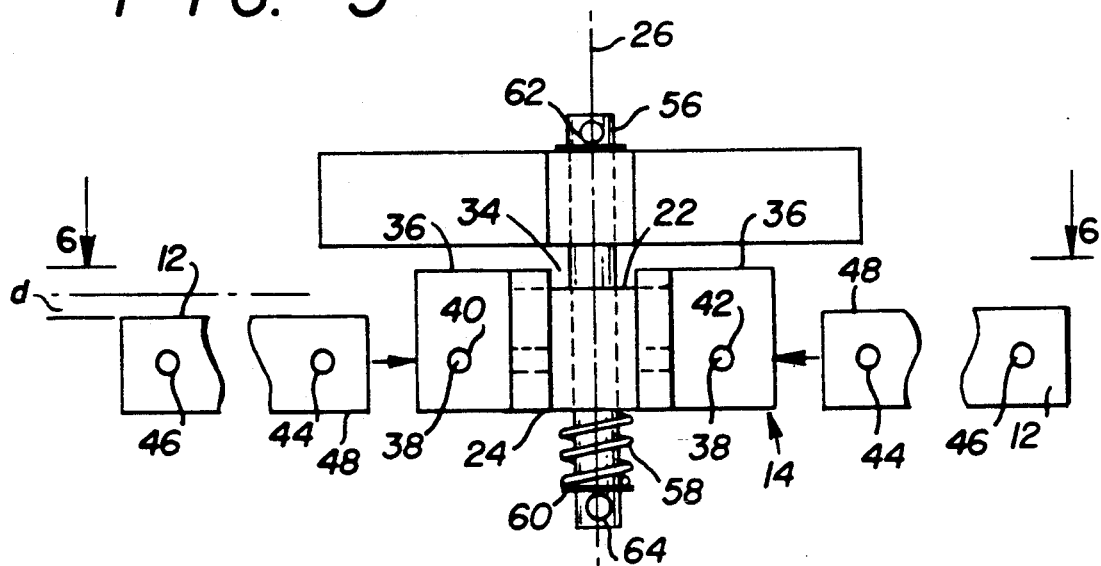
FIG. 5 is a side elevational view of the decoy holder assembly shown in FIGS. 1 and 2, the connecting rods being shown partially broken away and removed from the center block.
Figure 6:
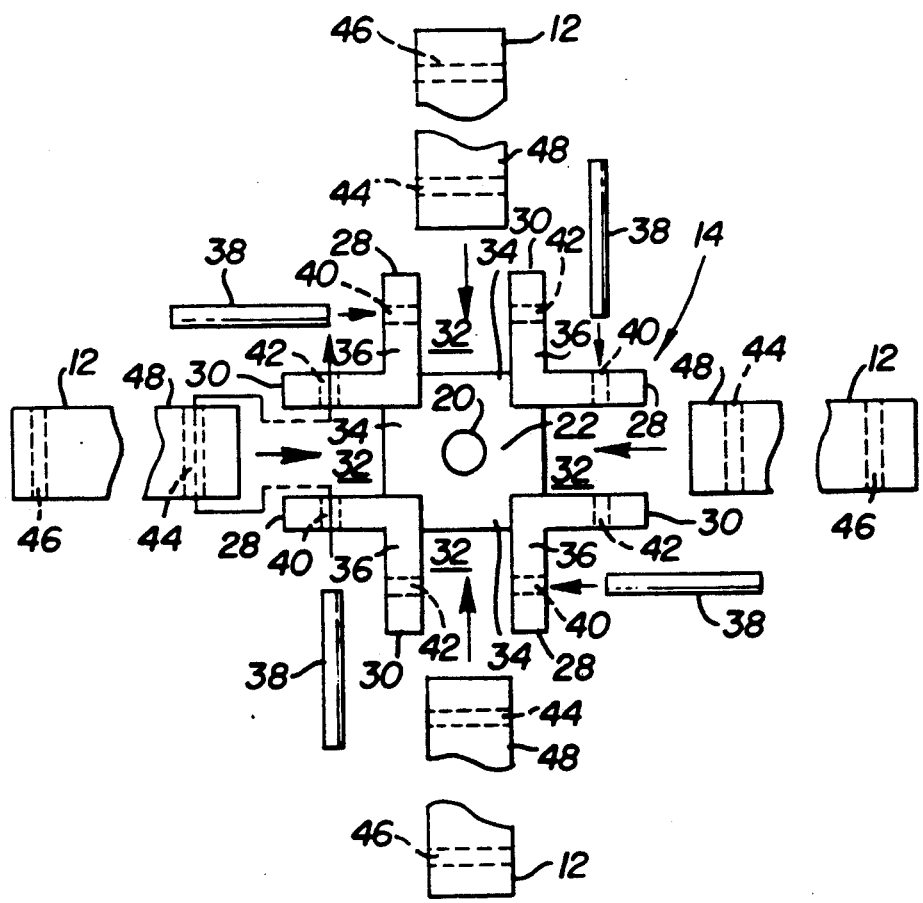
FIG. 6 is a top plan view of the decoy holder assembly taken along the line 6—6 in FIG. 5.

In FIGS. 5 and 6, the assembly of the four connecting rods 12 with the center block 14 is illustrated wherein one end of each rod 12 is pivotally mounted within one of the four slots 32 formed on each side of the block 14. As best shown in FIG. 6, each rod 12 is attached to the pair of spaced apart wall members 28, 30 by means of a pivot pin 38. The pivot pin 38 extends through two coincident apertures 40, 42 in each pair of wall members 28, 30, respectively, and a coincident aperture 44 in the end of the connecting rod 12. The other end of each connecting rod 12 is provided with an aperture 46 for attaching one of the swivel rings 18. It is important to note that the location of the apertures 40, 42 in the pair of wall members 28, 30 is such that when each connecting rod 12 is extended outwardly from the side of the center block 14 as shown in FIGS. 5 and 6, the top surface 48 of the rod 12 lies in a plane disposed below the top surface 22 of the center block 14. It will also be noted that the connecting rods 12 used in the embodiment of the invention illustrated are rectangular in cross-section so that the top surface 48 of each rod 12 is essentially flat, although this is not necessary and the rods could also be circular or some other shape if so desired.

Figure 7:
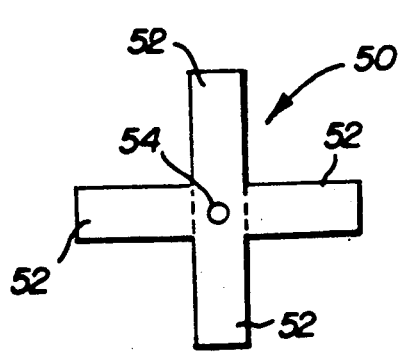
FIG. 7 is a reduced top plan view of the locking element used in the decoy holder assembly shown in FIG. 5.

In accordance with the invention, a locking element is provided for restricting movement of the connecting rods 12 from a position extending radially outwardly from the center block 14 to a position directly above the block. In the embodiment illustrated, the locking element takes the form of a cross 50 having four spaced apart, radially outwardly extending, arm members 52 as shown in FIG. 7. The arm members 52 are preferably rectangular in cross and should have a length at least equal to the distance between the central axis 26 and the pivot pins 38.

The cross 50 has a bore 54 extending along its central vertical axis for mounting the locking element onto a rotatable shaft 56. The shaft 56 is force-fitted at its upper end into the bore 54 in order to secure the cross 50 to the shaft.

As best shown in FIG. 5, the shaft 56 is rotatably mounted within the center bore 20 of the block 14. The shaft 56 extends past the bottom surface 24 and a bias member, e.g., a coil spring 58, is disposed around the shaft between the bottom surface 24 and a washer 60 affixed to the lower end of the shaft. An aperture 62 is provided within the upper end of shaft 56 for attaching a swivel ring 18 to hold the center decoy 10 in place as shown in FIGS. 1 and 2. Similarly, an aperture 64 is provided within the lower end of the shaft 56 for attaching another swivel ring 18 to secure the assembly to an anchor or weight 66 via a chord or chain 68.

It will be seen from the foregoing that the locking element is at all times biased in a downward direction by the coil spring 58 so that the arm members 52 are maintained in contact with the center block 14, except when the cross 50 is lifted in an upward direction against the force of the spring 58.

Figure 8:
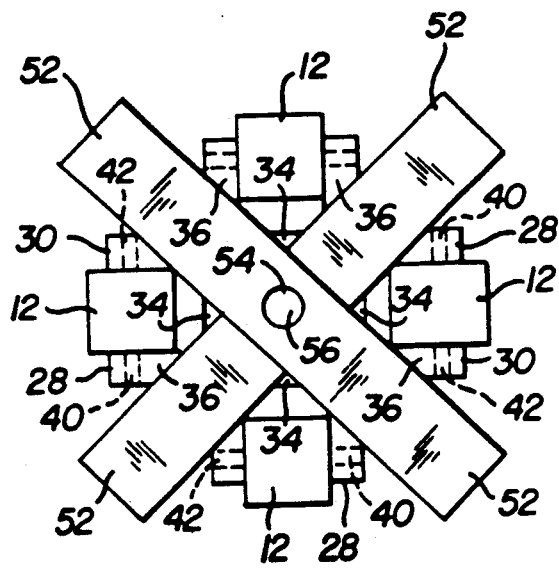
FIG. 8 is a top plan view of the decoy holder assembly as it appears in the unlocked position.
Figure 9:
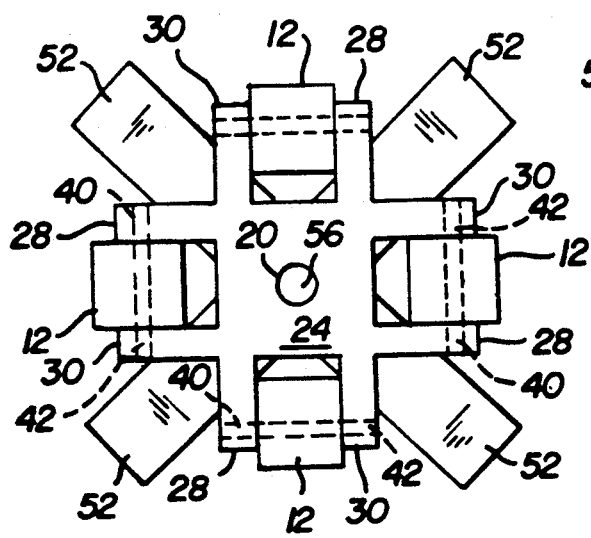
FIG. 9 is a bottom plan view of the unlocked decoy holder assembly shown in FIG. 8.

An important advantage of the invention is that the decoy holder can be assembled at the same time that the user is deploying the decoys on top of the water. Thus, with the locking element rotated to the unlocked position as shown in FIGS. 8 and 9, the user simply attaches the anchor 66 to the center block 14, throws the anchor overboard and then takes one connecting rod 12 at a time, affixing a decoy 10 to its outer end in case one is not already attached, and then places the connecting rod in the water. After deploying each of the connecting rods 12 in this manner, the user rotates the locking cross 50 to place the arm members 52 in overlying relationship with the connecting rods 12, thus prohibiting them from pivoting above the center block 14 which might otherwise cause the assembly to sink.

It will be appreciated that the assembly procedure described above is made possible by the fact that when the locking element is rotated to the unlocked position, the connecting rods 12 are free to pivot about the pivot pin 38 through an angle of 180 degrees or more from a position extending radially outwardly from the center block 14 to a position directly above the block. The user can assemble the decoy holder while seated in a boat floating on the water and while holding the center block 14 in his or her lap with the connecting rods 12 extending above the block. This simple, easy and convenient method of assembling the holder could not possibly be achieved with prior art decoy holders whose connecting rods were restricted to movement only below the center plate or block. In such cases, the entire holder must be assembled before placing it in the water which, unfortunately, is quite difficult and inconvenient due to the fact that the assemble is so large and bulky.

When it is desired to remove the assembly from the water, the user need only grasp the swivel ring 18 on top of the center block 14 and lift the entire assembly upwardly and out of the water. Even though the locking element is retained in the locked position with the arm members 52 overlying the connecting rods 12, there is sufficient space between the rods 12 and the arm members 52 to allow the rods to rotate or pivot downwardly as the whole assembly is withdrawn. This is probably best illustrated in the view of FIG. 5 wherein the top surface 22 of the center block 14, which supports the arm members 52, is shown elevated a distance "d" above the top surface 48 of the connecting rods 12. The distance "d" is chosen such that there will be sufficient room for the connecting rods 12 to rotate and clear the arm members 52 when they pivot downwardly below the center block 14.

Another important feature of the invention resides in the provision of indexing means for assuring proper location of the arm members 52 when the locking element is rotated to position them in overlying relationship with the connecting rods 12. This indexing means is effectively provided by the recess 34 which is formed between the wall members 28, 30 and the top surface 22 of the block 14. When rotated to the locked position as described above, the arm members 52 actually snap into place within the recesses 34 under the bias force of the spring 58. It will also be noted that when rotated to the unlocked position as shown in FIGS. 8 and 9, the arm members 52 will be forced by the coil spring 58 to rest on top of the L-shaped ridges 36 formed by the wall members 28, 30.

What is claimed is:

1. A decoy holder assembly comprising, in combination: a plurality of decoys, a center block, a plurality of connecting rods, means for attaching said decoys to said connecting rods, means for pivotally joining said connecting rods at one end to said center block, a locking element having a plurality of spaced apart outwardly extending arm members, and means for rotatably mounting said locking element to said center block, said locking element placing said arm members in overlying relationship with respect to said connecting rods when rotated to a first position while removing said arm members from said overlying relationship when rotated to a second position, said arm members securing said connecting rods in outwardly extending relationship with respect to said center block in said first position and, conversely, releasing said connecting rods so as to pivot freely about said center block in said second position.

2. A decoy holder assembly according to claim 1, wherein said means for rotatably mounting said locking element comprises a rotating shaft mounted within a bore extending through said center block along a vertical axis, said locking element being fixedly secured to one end of said shaft.

3. A decoy holder assembly according to claim 2, further including bias means applied to said shaft for urging said locking element into overlying relationship with said connecting rods.

4. A decoy holder assembly according to claim 3, further including means for indexing said arm members into positions overlying the end of said connecting rods pivotally joined to said center block.

5. A decoy holder assembly according to claim 4, wherein said means for pivotally joining said connecting rods comprises a plurality of spaced apart vertical wall members on said center block defining therebetween a plurality of slots extending radially outwardly from said vertical axis for receiving said one end of said connecting rods, said wall members having apertures therein which coincide with apertures in said connecting rods, and a pivot pin extending through said apertures in said wall members and said connecting rods.

6. A decoy holder assembly according to claim 5, wherein said indexing means is formed by portions of said wall members extending above said connecting rods in said slots to provide a plurality of open recesses for receiving said arm members when said locking element is rotated to said first position.

7. A decoy holder assembly according to claim 6, wherein said bias means comprises a coil spring disposed around the lower end of said shaft between a flange attached thereto and the bottom surface of said center block.

8. A decoy holder assembly according to claim 7, wherein said locking element is in the form of a cross having four spaced apart arm members extending radially outwardly from its central vertical axis and adapted to overlie said connecting rods in said slots.

9. A decoy holder assembly according to claim 8, wherein said means for attaching said decoys includes a swivel ring mounted onto each of said connecting rods and an elongated cord affixed between said decoys and said swivel ring.

10. A decoy holder assembly according to claim 1, further including means attached to said center block for anchoring said assembly.

11. A decoy holder assembly according to claim 1, further including means for positioning said arm members in spaced apart relationship from said connecting rods when said locking element is rotated to said first position.

* * * * *